United States Patent
Tucker et al.

(10) Patent No.: US 6,714,565 B1
(45) Date of Patent: Mar. 30, 2004

(54) OPTICALLY TUNABLE FABRY PEROT MICROELECTROMECHANICAL RESONATOR

(75) Inventors: Rodney S. Tucker, Hawthorn (AU); Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 298 days.

(21) Appl. No.: 09/704,004

(22) Filed: Nov. 1, 2000

(51) Int. Cl.[7] .................................................. H01S 3/10
(52) U.S. Cl. ...................... 372/20; 372/29.022; 372/32; 372/28; 372/99
(58) Field of Search ................................. 359/224, 244; 372/20, 29.011, 29.014, 32, 70, 29.022, 28, 99

(56) References Cited

U.S. PATENT DOCUMENTS

| | | | |
|---|---|---|---|
| 3,639,775 A | * 2/1972 | Patel | 359/285 |
| 5,062,155 A | * 10/1991 | Eda | 359/189 |
| 5,280,173 A | 1/1994 | Morse et al. | |
| 5,285,465 A | * 2/1994 | Schilling et al. | 372/50 |
| 5,401,956 A | 3/1995 | Dunphy et al. | |
| 5,457,707 A | * 10/1995 | Sobey et al. | 359/330 |

FOREIGN PATENT DOCUMENTS

| | | |
|---|---|---|
| EP | 0 298 598 | 6/1987 |
| EP | 0 608 611 A1 | 8/1994 |
| WO | WO 98/05995 | 2/1998 |

OTHER PUBLICATIONS

Szymaniec, K. et al., "Injection Locking of Diode Lasers to Frequency Modulated Source", Elsevier Science B.V., Optics Communications 144, Dec. 1, 1997, pp. 50–54.

* cited by examiner

Primary Examiner—Jerome Jackson
Assistant Examiner—Matthew C. Landau

(57) ABSTRACT

A tunable optical resonator whose resonance frequency is determined by a light signal introduced into the resonator. The resonator includes an optical cavity having a first mirror and a second mirror. The first mirror and second mirror are supported relative to one another such that the distance between the first and second mirrors may be altered by applying a force to said second mirror thereby altering the resonance frequency of said cavity. The resonator includes a light input port for receiving a tuning light signal, and a light signal generator for generating the tuning light source. The tuning light signal is introduced into the optical cavity such that the tuning light signal is reflected between the first and second mirrors. In the absence of the tuning light signal, the resonator has a resonance characterized by a resonance response curve centered at $\lambda_0$. The tuning light signal has a wavelength $\lambda_1$ within said resonance response curve and sufficient power to cause said resonance response curve to shift such that the resonance response curve is now centered at $\lambda_2$, where $\lambda_2 > \lambda_1$. In one embodiment of the invention, a circuit for monitoring the light leaving the resonator is utilized to control the wavelength and/or amplitude of the tuning light signal such that the light leaving the resonator has a predetermined wavelength.

12 Claims, 3 Drawing Sheets

OPTICALLY TUNABLE FABRY PEROT MICROELECTROMECHANICAL RESONATOR

FIELD OF THE INVENTION

The present invention relates to optical filters, and more particularly, to tunable Fabry-Perot optical resonators, filters and lasers constructed therefrom.

BACKGROUND OF THE INVENTION

Tunable optical resonators are utilized in optical communication systems and in the construction of lasers. Optical filters and lasers based on Fabry-Perot resonators can be constructed using microelectromechanical machining (MEM) techniques, and hence, can, in principle, provide an economically attractive tunable filter or tunable laser. In such devices, a Fabry-Perot resonator cavity is formed between two mirrors. One of these mirrors is flat and located on a semiconductor substrate. The other mirror may be curved and is suspended on a number of micro-mechanical cantilevers. Application of a tuning voltage between the cantilevers and the substrate causes the suspended mirror to move towards the fixed mirror on the substrate, thereby reducing the spacing between the two mirrors of the Fabry-Perot resonator. Since the filter's bandpass frequency is determined by the mirror spacing, a reduction in spacing between the two mirrors causes the resonant optical frequency of the cavity to increase. The shift in the resonant frequency enables the device to be used directly as a tunable bandpass filter. If an optically-pumped or electrically-pumped optical gain medium (active region) is placed in the cavity, the device becomes a tunable laser, with the lasing wavelength controlled by the resonant frequency of the Fabry-Perot cavity.

The need to provide a tuning voltage limits or complicates the use of such cavities. For example, the filter must be provided with an electrical power source and feedback circuitry to provide the correct tuning voltage. The tuning voltages are typically in the range of tens of volts. Such voltage levels are outside the usual control voltages on standard integrated circuits, and hence, the inclusion of this non-optical circuitry increases the cost and complexity of the devices.

Broadly, it is the object of the present invention to provide an improved MEM Fabry-Perot resonator.

It is a further object of the present invention to provide a MEM Fabry-Perot resonator that can be tuned via an optical signal without requiring that signal to be converted to an electrical control signal.

These and other objects of the present invention will become apparent to those skilled in the art from the following detailed description of the invention and the accompanying drawings.

SUMMARY OF THE INVENTION

The present invention is a tunable optical resonator whose resonance frequency is determined by a light signal introduced into the resonator. The resonator includes an optical cavity having a first mirror and a second mirror. The first mirror and second mirror are supported relative to one another such that the distance between the first and second mirrors may be altered by applying a force to said second mirror thereby altering the resonance frequency of said cavity. The resonator includes a light input port for receiving a tuning light signal, and an optional light signal generator for generating the tuning light source. The tuning light signal is introduced into the optical cavity such that the tuning light signal is reflected between the first and second mirrors. In the absence of the tuning light signal, the resonator has a resonance characterized by a resonance response curve centered at $\lambda_0$. The tuning light signal has a wavelength $\lambda_1$ within said resonance response curve and sufficient power to cause said resonance response curve to shift such that the resonance response curve is now centered at $\lambda_2$, where $\lambda_2 > \lambda_1$. In one embodiment of the invention, a circuit for monitoring the light leaving the resonator is utilized to control the wavelength and/or amplitude of the tuning light signal such that the light leaving the resonator has a predetermined wavelength.

BRIEF DESCRIPTION OF THE DRAWINGS

FIGS. 3(A)–(D) illustrate the manner in which the resonance response curve is controlled by controlling the tuning signal.

DETAILED DESCRIPTION OF THE INVENTION

Figure 2:
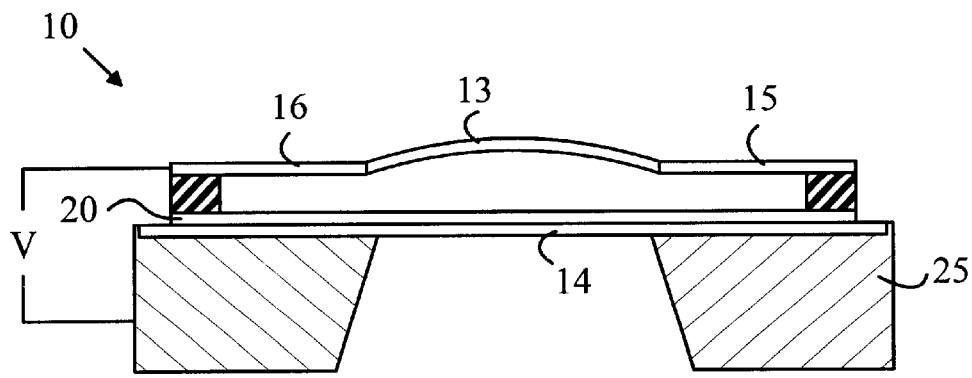
FIG. 2 is a cross-sectional view of the laser shown in FIG. 1 through line 11–12.
Figure 1:
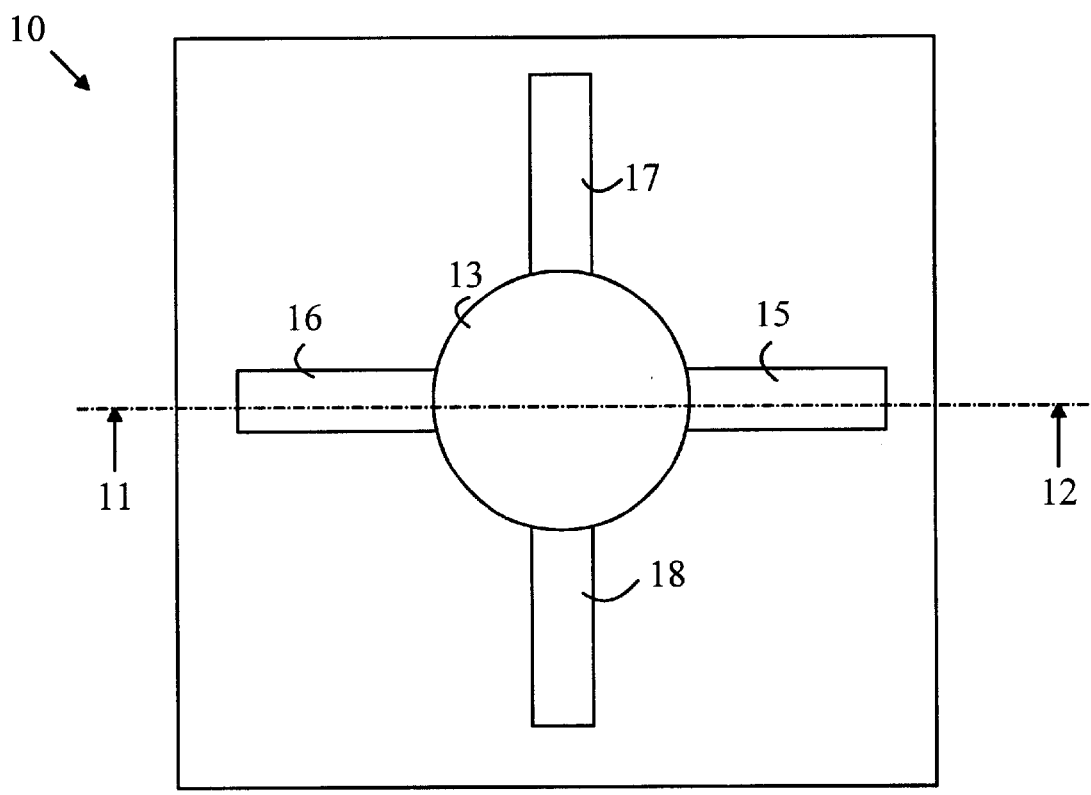
FIG. 1 is a top view of a prior art Fabry-Perot based filter or laser.

The present invention may be more easily understood with reference to FIGS. 1 and 2. FIG. 1 is a top view of a prior art Fabry-Perot based filter or laser. FIG. 2 is a cross-sectional view of the laser shown in FIG. 1 through line 11–12. A Fabry-Perot resonator cavity is formed between mirrors 13 and 14. Mirror 14 is flat and located on a semiconductor substrate 25. The mirror 13 is typically curved and is suspended on a number of micro-mechanical cantilevers shown at 15–18. The mirrors are preferably constructed from a number of layers of transparent material having indices of refraction that alternate from layer to layer. Such mirrors are well known to the art of semiconductor lasers, and hence, will not be discussed in detail here. To simplify the drawing, the layered structure of the mirrors has been omitted.

The application of a tuning voltage via a voltage source between the cantilevers and the substrate causes suspended mirror 13 to move towards mirror 14, thereby reducing the spacing between the two mirrors of the Fabry-Perot cavity. Since the resonant frequency of the cavity is determined by the distance between the mirrors, this reduction in spacing between the two mirrors causes the resonant optical frequency of the cavity to increase. The shift in the resonant frequency enables the device to be used directly as a tunable bandpass filter. If an optically-pumped or electrically-pumped optical gain medium 20 is placed in the cavity, the device becomes a tunable laser, with the lasing wavelength controlled by the resonant frequency of the Fabry-Perot cavity.

The present invention is based on the observation that prior art devices of the type shown in FIGS. 1 and 2 suffer from an undesirable wavelength-dependent tuning voltage. That is, the tuning voltage needed to set the resonance wavelength at any given value depends on the optical power density in the cavity for power densities above some predetermined value that depends on the physical characteristics of the device. This shift in tuning voltage is the result of the radiation pressure in the cavity. The radiation force tends to push the moving mirror in the Fabry-Perot cavity away from the fixed mirror. Thus, the radiation force tends to tune the filter or laser to longer wavelengths. The magnitude of the radiation force is proportional to the internal optical power in the cavity, which is proportional to the optical output power from the filter.

As the radiation force pushes the moveable mirror away from the fixed mirror, it also pushes the moving mirror against the spring forces generated by the cantilever arms 15–18 discussed above. When the increase in spring force matches the radiation force, the moveable mirror will stop moving and the filter or laser will exhibit a new resonant wavelength.

The present invention utilizes this effect to tune the resonant wavelength optically. By introducing an optical signal having a sufficient power into the cavity, the resonant wavelength of the cavity can be altered. It should be noted that the amount of power needed depends on the spring constants of the cantilever arms and on the "finesse" of the filter cavity. The finesse gives a measure of the number of times a photon is reflected back and forth. Fabry Perot resonators having a finesse of greater than 1000 are readily constructed using MEM techniques. The radiation pressure generated by a tuning signal is, in effect, amplified by a factor that is proportional to the finesse of the cavity. This amplification factor allows a relatively weak tuning signal to shift the resonant wavelength of the cavity by a large amount.

Figure 3A:
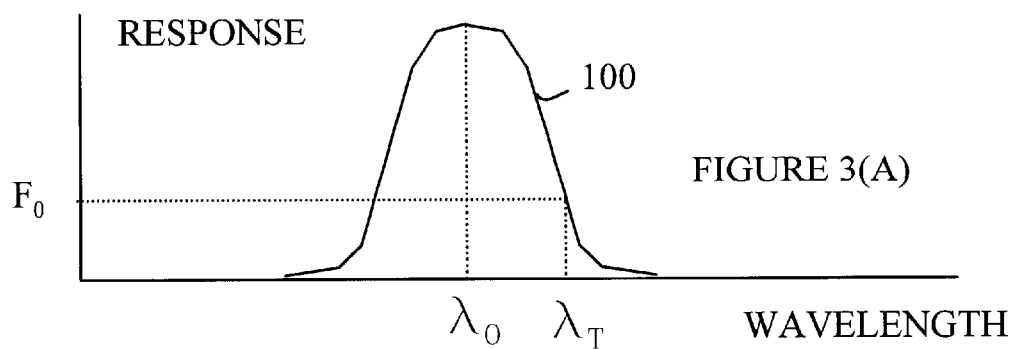
Figure 3B:
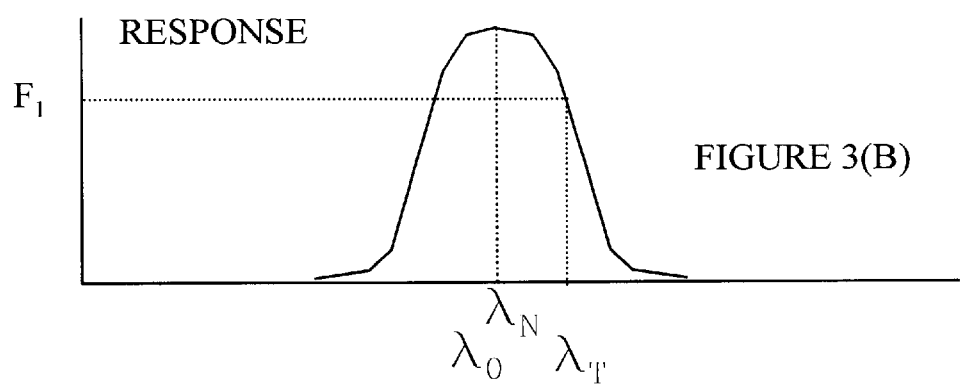
Figure 3C:
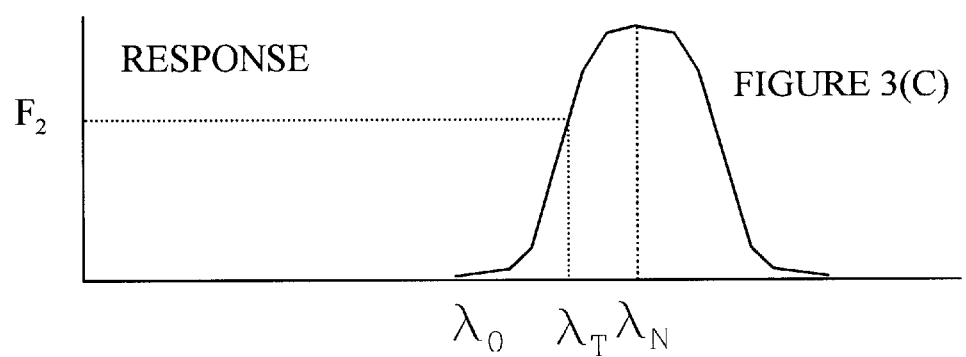

As will be explained in detail below, the wavelength of the tuning signal sets the resonant wavelength of the cavity to within an error that depends on the width of the cavity resonance. The power in the tuning signal can then be used to fine tune the resonance frequency. Consider a Fabry Perot resonator having a resonance at $\lambda_0$ in the absence of the tuning source. Denote the wavelength of the tuning source by $\lambda_T$. Refer now to FIGS. 3(A)–(C) which illustrate the manner in which the resonance wavelength of a Fabry Perot resonator shifts when a tuning signal of sufficient power is introduced into the cavity. For the purposes of this discussion, it will be assumed that the tuning signal wavelength is within the resonance response of the Fabry Perot cavity when the resonance wavelength is at $\lambda_0$. FIG. 3(A) illustrates the initial position of the filter response curve 100 and the relationship of the tuning wavelength to the resting wavelength $\lambda_0$. For the purposes of this discussion, it will be assumed that $\lambda_0 < \lambda_T$. The case in which $\lambda_0 > \lambda_T$ will be discussed in more detail below. When the tuning signal is introduced into the cavity, it initially generates a force $F_0$ on the moveable mirror. As noted above, $F_0$ will depend on the finesse of the cavity and the power level in the tuning signal. The radiation force $F_0$ causes the mirrors to move apart, and hence, the filter response curve shifts to a new location characterized by a new resonant wavelength $\lambda_N$ as shown in FIG. 3(B). The shift in the resonance response of the cavity increases the radiation force applied to the mirrors to a new value $F_1$, since the tuning wavelength is now closer to the center of the resonance response curve. However, as the moveable mirror moves away from its resting position, a restoration force that is proportional to the distance moved is applied by the cantilever arms. Since the resonance wavelength is proportional to the distance between the mirrors, the restoration force is also proportional to ($\lambda_N - \lambda_0$). The maximum radiation force will be generated when the resonance frequency coincides with $\lambda_T$, i.e, that $\lambda_N = \lambda_T$. If the maximum radiation force is greater than the restoration force at $\lambda_N = \lambda_T$, then the moveable mirror will continue to move to a position at which the new resonance wavelength is greater than the tuning wavelength as shown in FIG. 3(C). It should be noted that once $\lambda_N$ becomes greater than $\lambda_T$, the radiation force will decrease, while the restoration force continues to increase. Hence, the distance between the mirrors will finally stabilize. If the maximum radiation force is not greater than the restoration force at $\lambda_N = \lambda_T$, then the mirror separation will take on a value corresponding to $\lambda_N < \lambda_T$.

In the preferred embodiment of the present invention, the power in the tuning signal is chosen such that $\lambda_N > \lambda_T$, i.e., the configuration shown in FIG. 3(C). The reason this configuration is preferred lies in the stability of the mirror setting in the face of thermal noise. The moveable mirror is also subjected to thermal fluctuations that cause the mirror to vibrate about the position set by the tuning light signal and the spring restoration forces. These vibrations result in small oscillations in the center frequency of the filter response or laser. These oscillations, in turn, introduce amplitude fluctuations in the filtered light or laser light signal. Hence, an arrangement in which these noise fluctuations are reduced is preferred.

Suppose that the mirrors have stabilized as shown in FIG. 3(C), and thermal noise causes the moveable mirror to be displaced slightly closer to the fixed mirror. In this case, the resonance response curve will shift to slightly shorter wavelengths, and the radiation force will increase. The increased radiation force will cause the mirrors to move further apart, i.e., the radiation force will counter the force induced by the thermal noise. Next, consider the case in which the thermal noise force acts in a direction that causes the mirrors to move further apart. The filter response curve will then be shifted to a longer wavelength. This will result in a decrease in the radiation force. The decrease in force will, in turn, cause the mirrors to move closer together under the influence of the spring restoration force applied by the cantilever arms. Once again, the change in the radiation force acts to counter the force induced by the thermal noise.

If the power in the tuning signal is set such that the $\lambda_N < \lambda_T$, the radiation force amplifies the thermal noise forces, and hence, increases the thermal noise in the light signals processed by the filter. Assume that the mirrors have stabilized in the configuration shown in FIG. 3(B). If the thermal noise force causes the mirrors to move apart, the resonance response curve will shift to longer wavelengths, and the radiation force will also increase. The increased radiation force will cause the mirrors to move still further apart. Hence, the radiation force will amplify the thermal noise. Similarly, if the thermal noise causes the mirrors to move closer together, the resonance response curve will shift to lower wavelengths, and the radiation force will decrease causing a further shift to lower wavelengths. Once again, the thermal noise is amplified.

The above discussion assumed that the tuning wavelength was close to the resting wavelength in the sense that both wavelengths were within the resonance response curve of the filter. The resonance was then shifted to a new value that was determined by the tuning wavelength and the power level of the tuning source. The amount by which the resonance wavelength can be tuned using this approach is determined by the width of the resonance response curve for a fixed tuning wavelength. However, a much greater tuning range can be achieved by shifting the wavelength of the tuning light signal.

Figure 4:
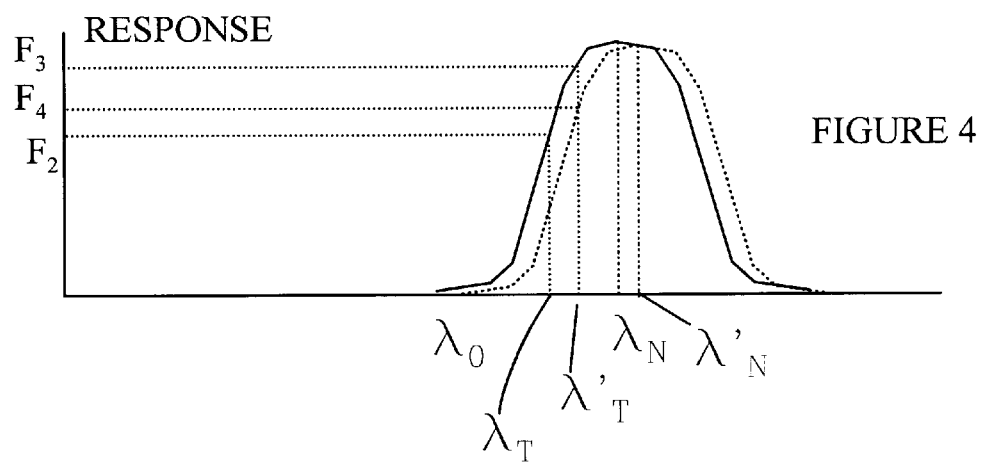
FIG. 4 is a plot of the filter response after the tuning signal has caused the moveable mirror to move.

Consider the case in which the tuning light signal has shifted the resonance wavelength to $\lambda_N$ and $\lambda_N > \lambda_T$ as shown in FIG. 4. Suppose the tuning wavelength is increased to a new tuning wavelength $\lambda'_T$. Then, the radiation force will increase from $F_2$ to $F_3$. The increase in radiation force will cause the mirrors to move further apart until the new force is balanced by the spring restoration force. It should be noted that the radiation force also decreases to $F_4$ as the filter response curve moves to higher wavelengths. Hence, the new filter response curve, shown in broken lines, will be located at a center wavelength $\lambda'_N > \lambda'_T > \lambda_N$. Hence, by slowly shifting the wavelength of the tuning light signal, the center frequency of the resonance response can be moved still further.

The distance the mirrors can be moved by shifting the tuning wavelength is determined by the maximum radiation force and the spring constants of the cantilever arms. For a fixed power in the tuning light signal, each time the wavelength is increased, the center wavelength of the resonance response moves closer to that of the tuning light signal when the mirror distance stabilizes. When the two wavelengths become the same, the maximum tuning for the current power level will have been achieved. Once this point has been reached, any further increase in the tuning wavelength will result in a decrease in the radiation force. The decrease in radiation force will result in the filter response curve shifting back to shorter wavelengths, which, in turn, will further reduce the radiation force. This shift will continue until the response curve shifts to a wavelength at which the tuning wavelength is no longer within the response curve, i.e., the radiation will then be zero. The spring restoration forces will then return the mirrors to their resting configuration, i.e., the center wavelength of the filter response curve will return to $\lambda_0$.

It will be apparent to those skilled in the art from the preceding discussion that the wavelength of the tuning signal sets the center wavelength of the resonance response curve of the Fabry Perot filter. The exact position of the center frequency of the response curve relative to the tuning signal wavelength and power cannot be accurately predicted theoretically; however, the relationship can be measured for several values of the tuning signal wavelength and power. Then, measured values can be used to generate the appropriate calibration curves.

As noted above, for any given tuning signal wavelength, the position of the resonance response curve can be fine-tuned by adjusting the power level of the tuning signal while leaving the wavelength fixed. Consider a Fabry Perot cavity in which the tuning signal power level is initially set such that the center wavelength of the response curve is longer than the wavelength of the tuning signal, i.e., the case shown in FIG. 3(C). If the power level of the tuning signal is increased, the mirror separation will increase, and the response curve will be shifted to longer wavelengths. This shift will reduce the radiation force, since the tuning signal wavelength will now be further from the center of the response curve. Hence, when the system stabilizes, the center wavelength of the response curve will have increased by an amount that is a small fraction of the width of the response curve. If the power is reduced slightly, the mirror separation will decrease, and the center frequency of the response curve will shift to shorter wavelengths. The radiation force will then increase because the tuning signal wavelength will now be closer to the center frequency of the response curve. This will partially counter the shift in the response curve. When the new equilibrium is achieved, the center wavelength of the response curve will have been reduced by a small fraction of the width of the response curve.

Figure 5:
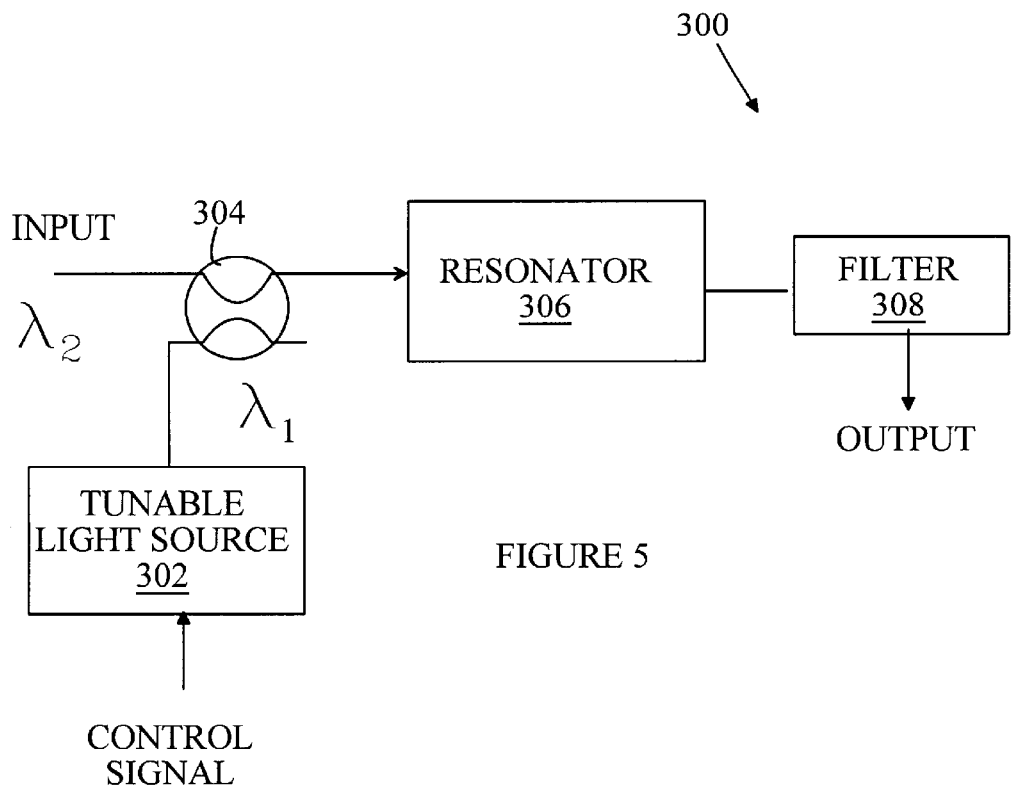
FIG. 5 is a block diagram of a tunable filter according to the present invention.

In general, the tuning wavelength is chosen to be different from the wavelength at which the Fabry Perot resonator is to operate in either a filter or a laser mode. A Fabry Perot resonator has resonances at wavelengths, $\lambda$, such that $2D = N\lambda$, where D is the optical distance between the mirrors and N is a positive integer. Accordingly, the tuning source can utilize a resonance at a first value of N to control the resonance about a wavelength at a different value of N. The tuning light signal can then be removed from the output light signal with the aid of a band-blocking filter that blocks the tuning light signal but not the signal of interest. Such an embodiment of the present invention is shown at 300 in FIG. 5, which is a block diagram of a tunable filter according to the present invention. The input light signal at $\lambda_2$ is combined with the light signal at wavelength $\lambda_1$ from a tunable source 302 by an optical coupler 304. The combined signal is applied to Fabry Perot resonator 306. The output of Fabry Perot resonator 306 is then passed through an optical filter 308 that blocks light at $\lambda_1$ but passes light at $\lambda_2$.

Figure 6:
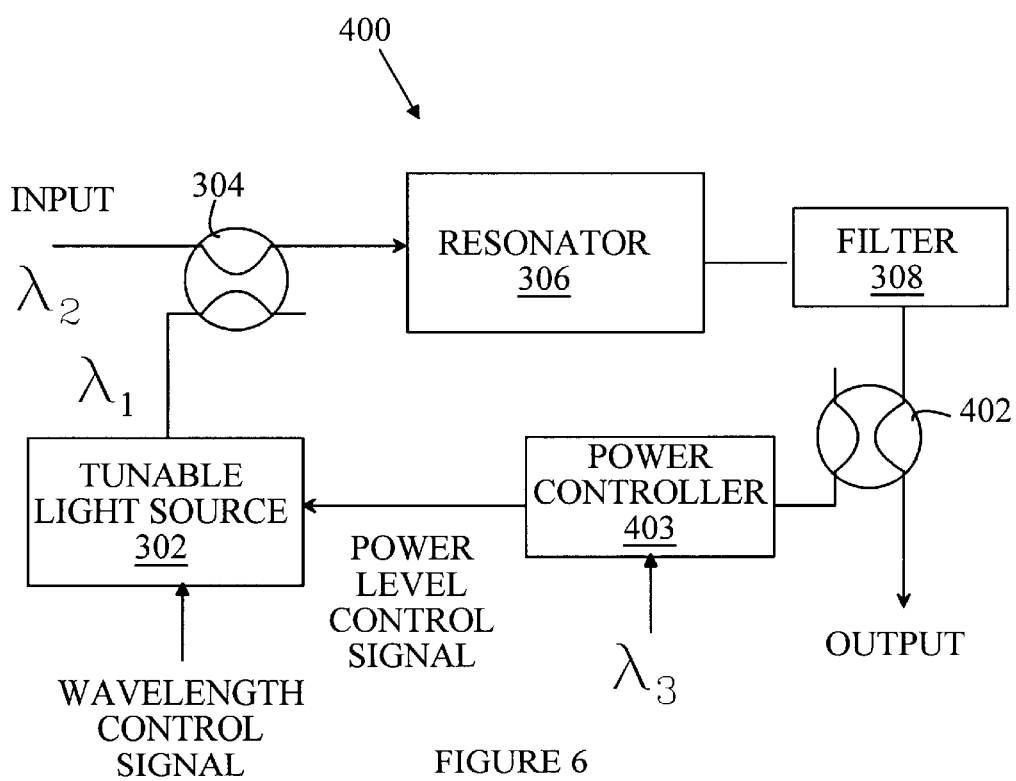
FIG. 6 is a block diagram of an embodiment of a tunable filter 400 according to the present invention in which the power level of the tuning signal is also adjusted to provide fine tuning of the resonance wavelength.

Refer now FIG. 6 which is block diagram of an embodiment of a tunable filter 400 according to the present invention in which the power level of the tuning signal is also adjusted to provide fine tuning of the resonance wavelength of resonator 306. To simplify the following discussion, those elements of tunable filter 400 that serve the same function as elements shown in FIG. 5 have been given like numeric designations. Tunable filter 400 samples the output of filter 308 via coupler 402. The sampled light signal is compared to a calibration light signal having a wavelength of $\lambda_3$ by a control circuit 403. Controller 403 generates an amplitude control signal that sets the amplitude of the output of light source 302 such that the output of filter 308 is brought closer to the desired wavelength. It should be noted that controller 403 may also generate the wavelength control signal for light source 302 based on the input calibration signal. It should also be noted that the calibration signal can be the output of light source 302 obtained from the unused port of coupler 304. In this case, controller 403 adjusts the amplitude to maintain the resonator center wavelength at a fixed difference from the wavelength of the tunable light source.

Optical comparators suitable for use in controller 403 are known to the optical arts, and hence, will not be discussed in detail here. It is sufficient to note that an optical mixer for combining the calibration light signal with the sampled output light signal and a detector for measuring the resulting beat frequency can be utilized if the difference in wavelengths is not large.

In general, arrangements in which the distance between the mirrors is large compared to the Fabry Perot resonator working resonance are preferred, since the effects of thermal noise are reduced as the mirror separation is increased. Unfortunately, in prior art electrically tuned Fabry Perot resonators, the need to keep the tuning voltages as small as possible prevents the designer from taking advantage of this means for reducing noise. However, it will be appreciated from the preceding discussion that the present invention does not impose any such limitations, and hence, wider mirror separations may be utilized.

The above embodiments of the present invention have assumed a separate tuning light signal generator. However, it will be obvious to those skilled in the art from the preceding discussion that the present invention may be used to track an existing optical signal that is generated at a location remote from the filter. Hence, a filter system according to the present invention does not require a power source at the Fabry Perot resonator to control the wavelength of the resonance. This allows the present invention to control a filter or laser that is in a remote location lacking power and having a markedly different temperature environment then that of the controller 403 or light source 302.

In general, prior art MEM Fabry Perot resonators when designed even for a fixed frequency must include some form of feedback circuit for precisely setting and holding the resonant frequency at the desired value. The variations in the MEM process from device to device across a wafer will cause small variations in the resonance frequency. Hence, the mirrors must be set with the applied tuning voltage by comparing the output light wavelength with that of a standard light source at the desired resonant wavelength or a multiple thereof. For high precision applications, a feedback system must constantly adjust the applied voltage to compensate for other factors that change the mirror distance such as temperature changes. Hence, the present invention, even with feedback controller 403 and light source 302, is no more expensive than conventional MEM Fabry Perot resonators.

While the above embodiments of the present invention have utilized a fixed mirror and a moveable mirror, it will be obvious to those skilled in the art from the preceding discussion that embodiments in which both mirrors are moveable may also be constructed without deviating from the teachings of the present invention. For example, the mirrors can both be mounted on flexible arms that are connected to a fixed substrate. Such embodiments, while more difficult to construct, require half the power in the tuning light signal.

Various modifications to the present invention will become apparent to those skilled in the art from the foregoing description and accompanying drawings. Accordingly, the present invention is to be limited solely by the scope of the following claims.

What is claimed is:

1. A tunable optical resonator comprising:

an optical cavity having a first mirror and a second mirror, said first mirror and said second mirror separated by a distance, said first mirror and said second mirror being mounted with respect to one another such that a force applied to said second mirror will cause said distance between said mirrors to change, said resonator having a resonance characterized by a resonance response curve centered at a wavelength $\lambda_0$;

a light source for generating a tuning light signal having a wavelength within said response curve; and a light input port for receiving said tuning light signal, said tuning light signal being introduced into said optical cavity such that said tuning light signal is reflected between said first and second mirrors, said tuning light signal having sufficient power to shift said wavelength of said resonance response curve to $\lambda_1$, wherein $\lambda_1 > \lambda_0$.

2. The resonator of claim 1 wherein said tuning light signal has a wavelength different from $\lambda_0$.

3. The resonator of claim 1 wherein said resonator further comprises a filter for blocking light of a wavelength equal to said wavelength of said tuning light signal from leaving said resonator.

4. The resonator of claim 1 further comprising a circuit for monitoring light leaving said resonator and altering said wavelength of said tuning light source so as to maintain the wavelength of said monitored light at a predetermined value.

5. In a method for tuning an optical resonator having an optical cavity comprising a first mirror and a second mirror, said first and second mirrors being separated by a distance that is alterable by applying a force to one of said first and second mirrors, said resonator having a resonance characterized by a response curve centered at a wavelength $\lambda_0$, the improvement comprises introducing a tuning light signal into said cavity such that said tuning light signal is reflected back and forth between said first and second mirrors, said tuning light signal having a wavelength within said resonance response curve and having a signal strength sufficient to cause said center of said resonance response curve to shift to $\lambda_1$, wherein $\lambda_1 > \lambda_0$.

6. The method of claim 5 wherein said tuning light signal has a wavelength different from $\lambda_0$.

7. The method of claim 5 further comprising the step of altering said wavelength of said tuning light signal to cause the center of said resonance response curve to shift to another wavelength.

8. The method of claim 5 further comprising the step of altering said signal strength of said tuning light signal to cause the center of said resonance response curve to shift to another wavelength.

9. The method of claim 5 wherein said optical resonator receives a light signal having light of a wavelength $\lambda_2$ wherein $N\lambda_1 = M\lambda_2$, N and M are positive integers and $N \neq M$.

10. The method of claim 9 further comprising the step of providing a filter for blocking light of a wavelength equal to said wavelength of said tuning light signal.

11. The method of claim 5 further comprising the step of monitoring light leaving said resonator and altering said wavelength of said tuning light source so as to maintain the wavelength of said monitored light at a predetermined value.

12. The method of claim 5 further comprising the step of monitoring light leaving said resonator and altering said signal strength of said tuning light source so as to maintain the wavelength of said monitored light at a predetermined value.

* * * * *